United States Patent [19]

Naitou et al.

[11] Patent Number: 5,789,057
[45] Date of Patent: Aug. 4, 1998

[54] SHEET BLOW MOLDING AND MOLDING METHOD

[75] Inventors: Kazunori Naitou, Nara; Yuuki Seki, Osaka, both of Japan

[73] Assignee: Tsutsunaka Plastic Industry Co., Ltd., Osaka, Japan

[21] Appl. No.: 656,867

[22] Filed: May 30, 1996

[30] Foreign Application Priority Data

Jun. 2, 1995 [JP] Japan .................... 7-159921

[51] Int. Cl.⁶ ................................. B32B 3/12
[52] U.S. Cl. .................. 428/73; 156/245; 156/292; 428/116
[58] Field of Search .................... 428/116, 118, 428/73; 156/245, 292

[56] References Cited

U.S. PATENT DOCUMENTS

| | | | |
|---|---|---|---|
| 2,919,472 | 1/1960 | Steele | 428/116 X |
| 3,103,460 | 9/1963 | Picket | 428/116 X |
| 5,238,725 | 8/1993 | Effing et al. | 428/116 |
| 5,316,604 | 5/1994 | Fell | 428/116 X |
| 5,328,744 | 7/1994 | Kaufmann et al. | 428/116 |

*Primary Examiner*—Henry F. Epstein
*Attorney, Agent, or Firm*—Oblon, Spivak, McClelland, Maier & Neustadt, P.C.

[57] ABSTRACT

A method for molding a sheet blow molding, wherein a board member as a core of the sheet blow molding is placed between a pair of thermoplastic sheets facing each other and separated by a predetermined distance. Opposite ends of the sheets are clamped by dampers so as to form clamped sheets with a closed space between the clamped sheets. The clamped sheets are heated by a heater and air is supplied to the closed space. The clamped sheets are pressed between molds so as to cover all outer surfaces of the board member and to be thermally bonded to the board member.

4 Claims, 5 Drawing Sheets

SHEET BLOW MOLDING AND MOLDING METHOD

BACKGROUND OF THE INVENTION

1. Field of the Invention

This invention relates to a lightweight laminated panel used as a building material for floors, walls and ceilings and the like or as a material for walls or housings of vehicles, aircraft, ships, refrigerators and office equipment and so on, and particularly relates to a sheet blow molding with a core and a method of manufacturing the same.

2. Discussion of the Background

Because lightweight laminated panels have good wall surface load resistance and insulating, soundproofing and vibration characteristics, lightweight laminated panels of various materials and structures have been put on the market. These include many laminated panels having boards with honeycomb-like structures, foam boards, plaster boards and the like as cores; and having thermoplastic plastic films, sheets or plates (hereinafter referred as thermoplastic plastic sheets) as surface materials. It is also well known that laminated panels are made by the steps of molding thermoplastic sheets to form a container member and a cover member by means of vacuum molding or thermal molding; putting a core inside the container member; fitting the cover member; and sealing the container member and the cover member together by an adhesive.

Conventional sheet blow moldings and molding methods, on the other hand, because they have generally been for containers, have been completely hollow structure formation technology.

In conventional lightweight laminated panels having thermoplastic plastic sheets as surface materials, because they have the construction described above, the core is exposed at the side of the panel, and because of lack of strength invasion of water and the like also tend to occur, and thus functional deterioration of the core has readily occurred. Further, particularly when a honeycomb core is used, it is difficult to obtain a sufficient area to be adhered to the surface material when the core is adhered to the surface material. Accordingly, the problems arise in that peeling occurs, and that a large amount of adhesive is required to obtain a sufficient adherence.

In the case of lightweight laminated panels made by box formation using vacuum molding or thermal molding, on the other hand, there have been numerous problems of process and raw material complexity. Namely, since the container member and the cover member are made separately, a heat-sealing step or an adhering step using an adhesive is required to adhere the container member and the cover member.

SUMMARY OF THE INVENTION

Accordingly, an object of this invention is to provide an integral molding of a lightweight laminated panel having thermoplastic plastic sheet as a surface material and a method of molding the same which does not necessitate a separate adhering step for adhering the surface material to a core and in which it is possible to amply secure adhesion of the two if necessary. The integral molding made according to the present invention has no substantial exposure of the core.

As a result of accumulating assiduous research in order to achieve this object and other objects, the present inventors have solved the above-mentioned problems by succeeding in realizing a novel technological idea based on sheet blow molding technology (also called double sheet molding or twin composite molding), which has hitherto chiefly been used for the formation of ordinary, simple hollow structures.

A first aspect of the invention provides a sheet blow molding comprising an inserted core; a second aspect of the invention provides a panel-shaped body with a honeycomb-like structure, with which strength can be secured even in a light and thin molding, is preferable as the core; a third aspect of the invention provides a method of molding a sheet blow molding containing a core wherein a core (8) is disposed between two thermoplastic plastic sheets (1, 1') facing each other with a predetermined gap therebetween, the edges of the sheets are clamped and thereby made to form a closed space S and then the thermoplastic plastic sheets (1, 1') are clamped between a pair of molds 6, 6', blow-molded and pinched off; and a fourth aspect of the invention provides a preferable thickness of a core used in this molding method.

As shown in FIG. 1, a sheet blow molding of this invention comprises a core 8 inserted inside a blow molded container member formed by a surface material 9 integrally molded with a parting line.

The thermoplastic plastic sheet (also just called a sheet) used for the surface material 9 can be suitably selected according to the application for which the molding is to be used, and thermoplastic plastic sheets made of vinyl chloride resins such as copolymers having polyvinyl chloride and vinyl chloride as main components, acrylic resins such as polymethyl methacrylate and copolymers thereof, olefin resins such as polyethylene and ethylene copolymers or polypropylene, polyester resins such as polyethylene terephthalate and polybutylene terephthalate, thermoplastic resins such as polycarbonate resin and polyamide resin, or polymer blends and grafts with these as main components or various other thermoplastic compositions can be used. A sheet thickness suitable for this invention is 1 to 10 mm, and the materials and colors of the two thermoplastic plastic sheets 1, 1' may be different.

As the core, any plate-shaped body of a lightweight structure which has heat-resistance and does not obstruct blow molding can be used. Materials which can be used for the core include organic materials such as plastic, paper and wood, inorganic materials such as metal, glass, asbestos, ceramics and plaster and composites of these. Shapes and structures which can be used for the core include panels of honeycomb-like structure having multiple open passages (which may be any shape such as a square, hexagonal or circle) extending in the thickness direction of the panel, porous bodies, columnar bodies, frame-shaped bodies, corrugated bodies and so on. In particular, a honeycomb-like panel shown in FIG. 2 is preferable for increasing the resistance to surface loads and the insulating and soundproofing performance of a molding of the invention.

Also, preferably, to ensure a free flow of air during blow molding, irregularities or wave forms are provided in the upper and lower surfaces of the panel-shaped core to form a continuous space between the sheet and the core or the core is divided into a plurality of pieces. With a panel of honeycomb-like structure having open passages in its thickness direction, the blow-moldability can be further improved by providing ventilation holes in the walls of the passages.

The size (in the example shown in FIG. 2, the height X', the width Y' and the thickness T') of the core is less than the size of the molding (in the example shown in FIG. 1, the height X, the width Y and the thickness T) and can be suitably set in a range such that its blow-moldability is not impaired according to the application in which the molding is to be used.

DETAILED DESCRIPTION OF THE PREFERRED EMBODIMENTS

A preferred mode of practicing a method of molding a sheet blow molding with a core according to the invention will now be described with reference to the accompanying drawings.

Figure 3:
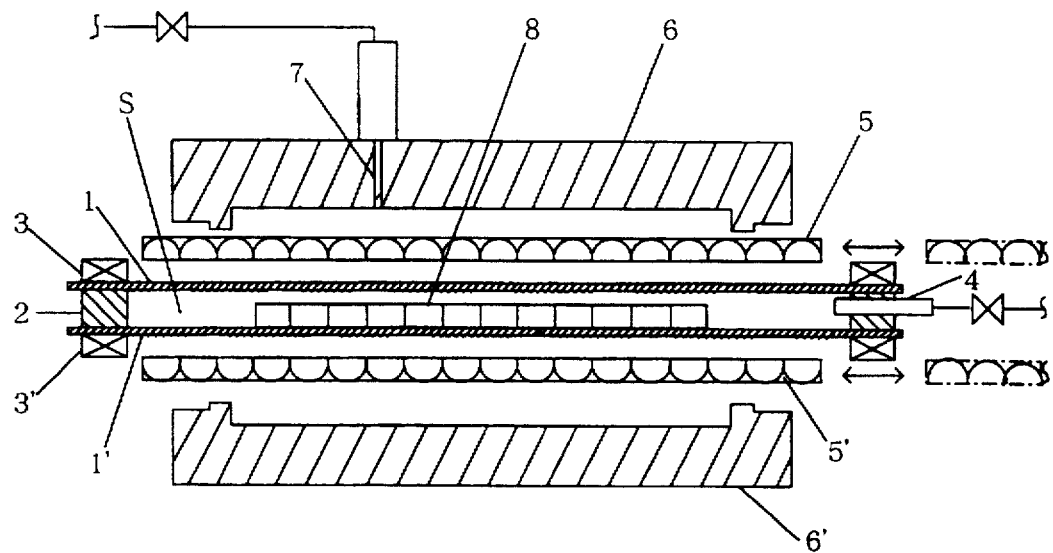
FIG. 3 is a sectional view of a blow molding apparatus illustrating commencement of heating in a molding method according to the invention.

First, as shown in FIG. 3, in a sheet blow molding apparatus, a core 8 is placed on a thermoplastic plastic sheet 11 and then the thermoplastic plastic sheet 1' and a thermoplastic plastic sheet 1 are held a predetermined distance apart by a spacer 2 and clamped by clampers 3, 3' and a closed space S is thereby formed. If necessary, part of the core 8 can be provisionally fixed to the sheet 1' by being adhered thereto with an adhesive or with a hot melt adhesive such as wax or a low melting point resin-form substance or with a pressure sensitive adhesive. The sheets 1, 1' are then heated with movable far infrared heaters 5, 5'. Here, if necessary, an air nozzle 4 for pretensioning can be operated.

Figure 4:
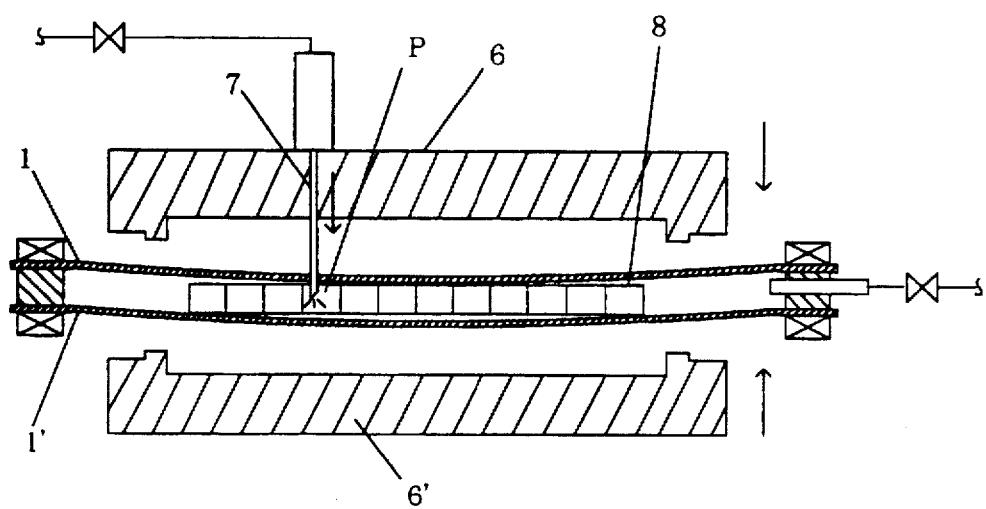
FIG. 4 is a sectional view of the same blow molding apparatus illustrating commencement of air blowing in a molding method according to the invention.

Next, as shown in FIG. 4, when the sheets 1, 1' have been softened to a suitable extent, the heaters 5, 5' are moved away. Immediately after that, an air nozzle 7 for blow molding is inserted into the closed space S and blowing air into the closed space C is started. Closing of molds 6, 6' is then carried out.

Figure 5:
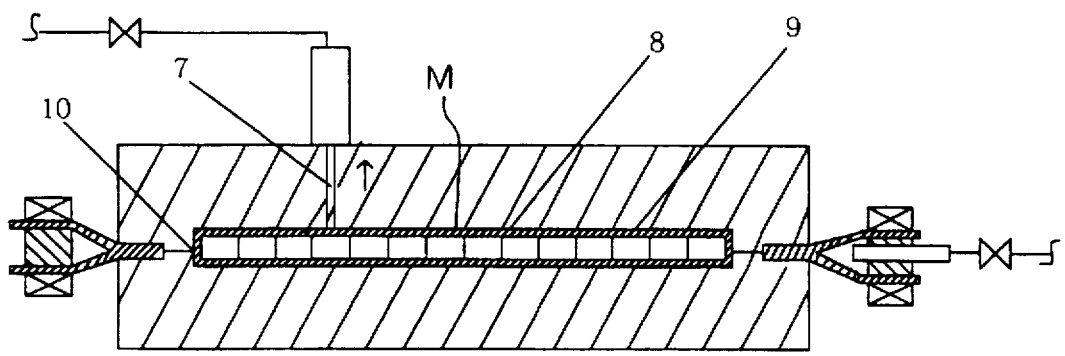
FIG. 5 is a sectional view of the same blowing apparatus illustrating completion of air blowing in a molding method according to the invention.

By the steps described above, as shown in FIG. 5, the core 8 is insert-molded inside a container member formed by the surface material 9 which is molded from the sheets 1, 1' by the inner surfaces of the molds 6, 6', the surface material 9 is pinched off by the molds 6, 6' and a blow molding M with a parting line 10 is formed.

Figure 6:
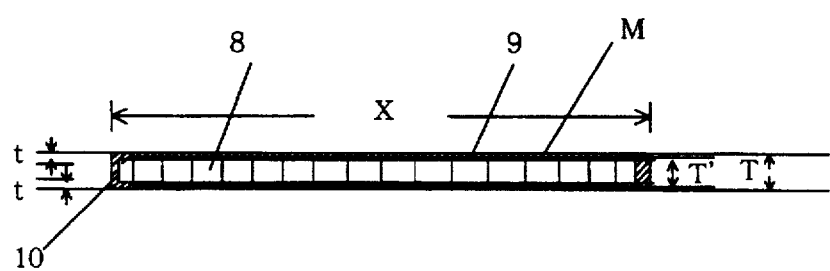
FIG. 6 is a sectional view on the line A—A' in FIG. 1.

When the thickness of the blow-molded surface material 9 is designated by a reference t and the thickness of the molding is designated by a reference T, if as shown in FIG. 6 the thickness T' of the core is determined such that T' is smaller than T and larger than T-2t, parts of the core 8 become embedded in parts of the surface material 9 of the molding during molding and the core 8 is thereby fixed to the surface material 9 without any adhesive being required.

Preferred embodiments of the invention will now be described.

First Preferred Embodiment

According to the preferred mode of practicing the invention described above, a panel-shaped blow molding with a core (X=800 mm, Y=500 mm, T=30 mm) was manufactured under the following conditions:

|1| As the sheets 1, 1', acrylic modified high-impact vinyl chloride plates of thickness 0.2 mm were used.

|2| The sheet surface temperature at the sheet surface to which the sheets were heated in the step illustrated in FIG. 3 was 180° C.

Figure 1:
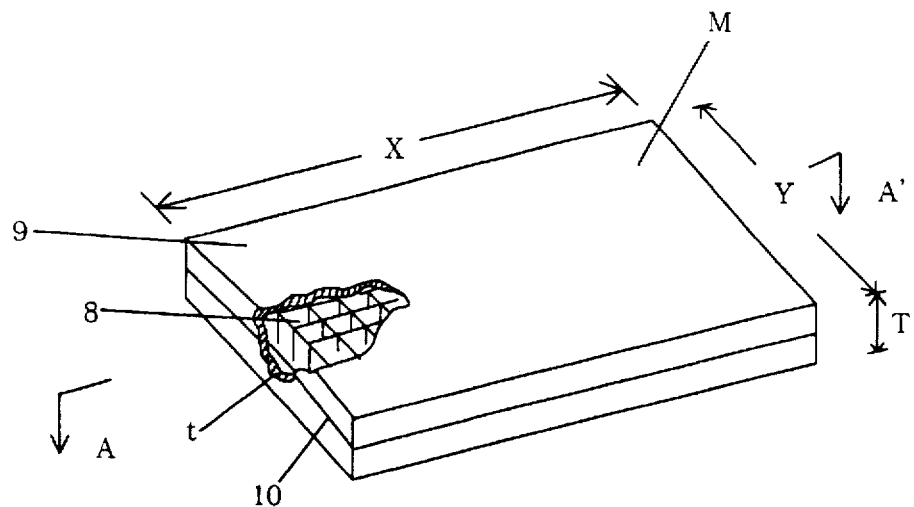
FIG. 1 is a partially cutaway perspective view of an example of a sheet blow molding according to the invention (wherein the core is a panel of honeycomb-like structure)
Figure 2:
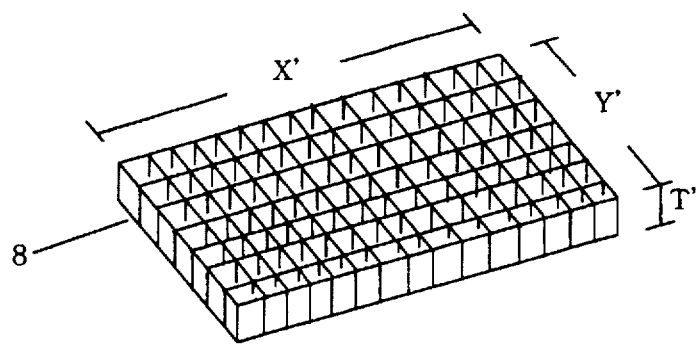
FIG. 2 is a perspective view of a panel of honeycomblike structure as an example of a core.

|3| A paper honeycomb structure having a size of X'=760 mm, Y'=460 mm, and T'32 27 mm shown in FIG. 2 was used as the core 8.

Figure 7:
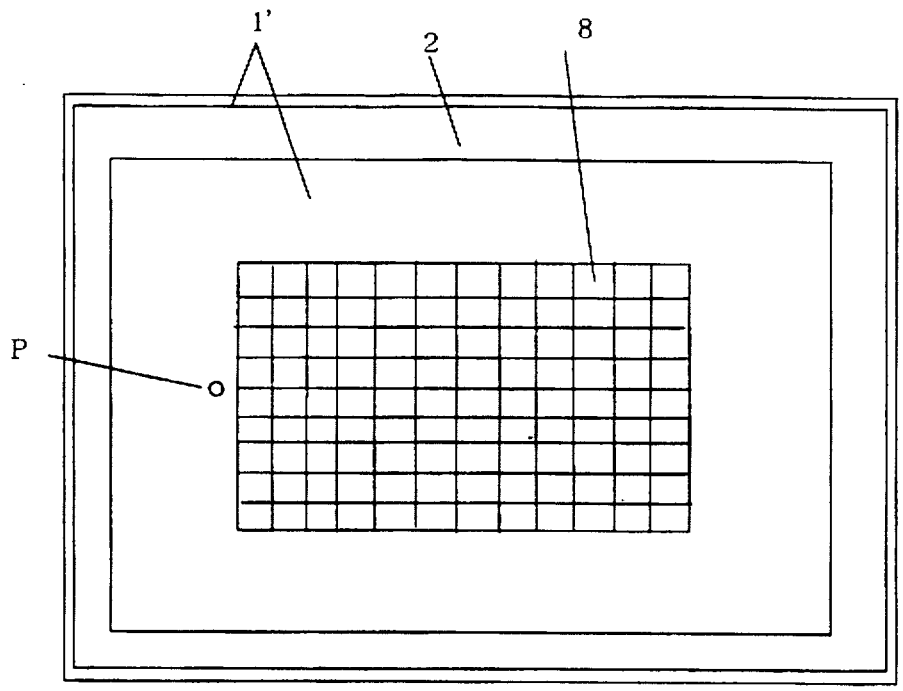
FIG. 7 is a plan view showing the positioning of the core 8 in a first preferred embodiment of the invention.

|4| The core 8 was disposed on the sheet 1' as shown in FIG. 7.

Figure 8:
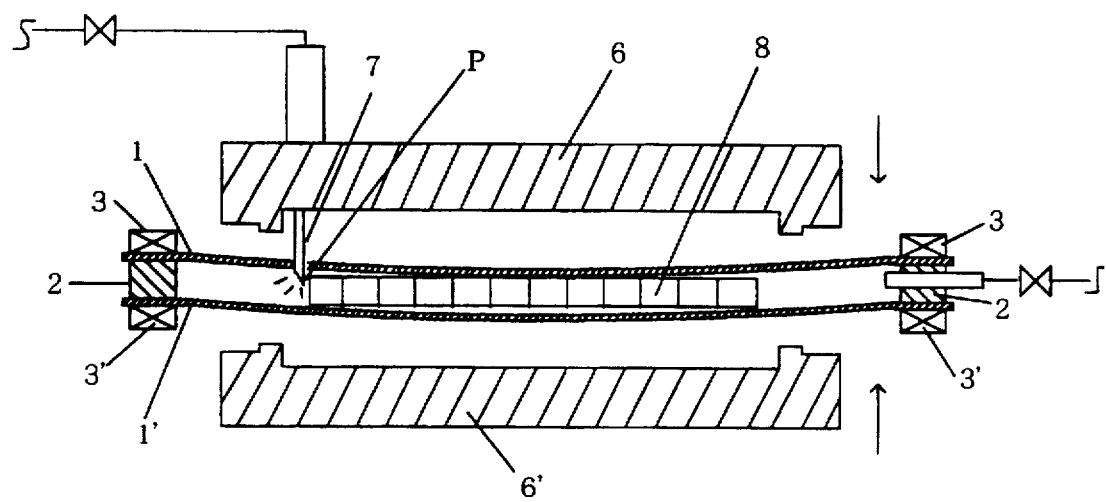
FIG. 8 is a sectional view of the blow molding apparatus illustrating the commencement of air blowing in the first preferred embodiment of the invention.

|5| The air nozzle 7 for blow molding was disposed at the end of the molding, as shown in FIG. 8, and the nozzle insertion position P was positioned as shown in FIG. 7 and FIG. 8.

|6| The mold clamping gauge pressure in the step illustrated in FIG. 8 (the same step as that of FIG. 4) was 80 kg/cm² and the pressure of the blown air was 3 kg/cm².

Second Preferred Embodiment

Figure 9:
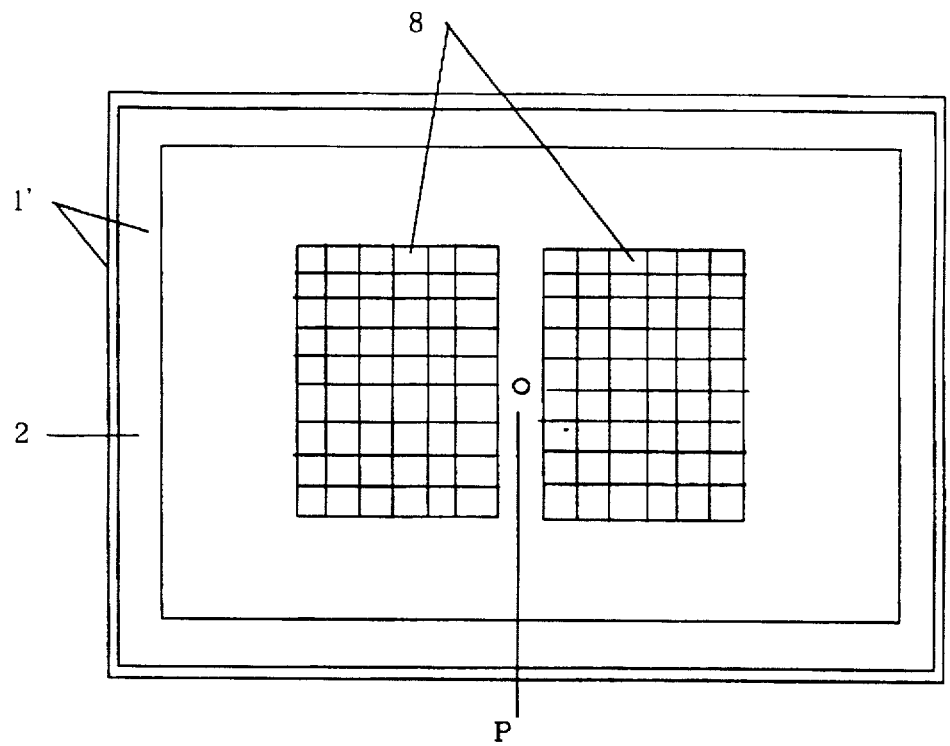
FIG. 9 is a plan view showing the positioning of the core 8 in a second preferred embodiment of the invention.
Figure 10:
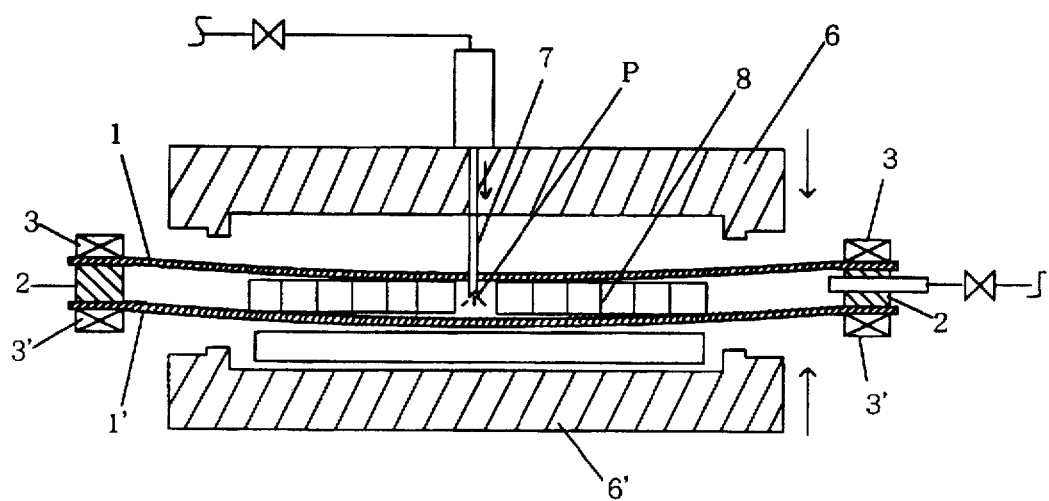
FIG. 10 is a sectional view of the blow molding apparatus illustrating the commencement of air blowing in the second preferred embodiment of the invention.

Two cores 8 having a size of X'=380 mm, Y'=460 mm, and T'=27 mm were disposed on the sheet 11 as shown in FIG. 9, the air nozzle 7 for blow molding was disposed centrally as shown in FIG. 10 and the nozzle insertion position P was positioned as shown in FIG. 9 and FIG. 10. Otherwise in exactly the same way as in the first preferred embodiment, a panel-shaped blow molding with a core having the same size as that of the first preferred embodiment was manufactured.

Some of the effects and benefits of the invention are as follows:

1. Because a sheet blow molding according to the invention comprises a lightweight core inside a practically integrally formed hollow container member, its resistance to surface loads is good, incidents of gas and water invading do not readily occur and its insulating and soundproofing performance are excellent.

2. When a panel of honeycomb-like structure having multiple open passages in its thickness direction is used as the core, the core is well suited to blow molding, and a light molding having particularly good insulating and soundproofing performance can be obtained. Also, in this case, if ventilation holes are provided in the walls forming the honeycomb-like structure, the suitability of the core for blow molding is increased further.

3. It is possible to use a conventional sheet blow molding method as the method of molding a blow molding with a core according to the invention, and furthermore it is possible to make a molding of high added value which cannot be obtained with conventional technology.

4. By setting the thickness of the core within a predetermined range, it is possible to make a part of the core become embedded in a part of the surface material constituting the container body of the molding, and thereby fix the core to the surface material without adhesive.

What is claimed is:

1. A sheet blow molding comprising:

a board member adapted to be a core of the sheet blow molding; and a surface material which is formed of thermoplastic plastic sheets covering all outer surfaces of said board member, said thermoplastic plastic sheets being thermally bonded to all the outer surfaces of said board member upon being clamped between a pair of molds and blow molded.

2. A sheet blow molding according to claim 1, wherein said board member has a honeycomb structure.

3. A method for molding a sheet blow molding, comprising the steps of:

disposing a pair of thermoplastic sheets facing each other and separated by a predetermined distance;

placing a board member as a core of the sheet blow molding between said sheets;

clamping opposite ends of said sheets by dampers so as to form clamped sheets with a closed space between said clamped sheets;

heating said clamped sheets by a heater;

supplying air to said closed space; and pressing said clamped sheets between molds so as to cover all outer surfaces of said board member and to be thermally bonded thereto.

4. A method according to claim 3, wherein said sheets are partially embedded in said board member.

* * * * *